United States Patent
Kava

(10) Patent No.: US 9,630,622 B2
(45) Date of Patent: Apr. 25, 2017

(54) ADJUSTING A HYBRID VEHICLE CRUISE CONTROL SPEED

(71) Applicant: FORD GLOBAL TECHNOLOGIES, LLC, Dearborn, MI (US)

(72) Inventor: Chris Michael Kava, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 14/329,408

(22) Filed: Jul. 11, 2014

(65) Prior Publication Data

US 2016/0009277 A1  Jan. 14, 2016

(51) Int. Cl.

| | |
|---|---|
| *B60L 9/00* | (2006.01) |
| *G07C 5/00* | (2006.01) |
| *B60K 1/02* | (2006.01) |
| *B60W 30/14* | (2006.01) |
| *B60W 20/10* | (2016.01) |
| *B60W 30/18* | (2012.01) |
| *B60W 10/06* | (2006.01) |
| *B60W 10/08* | (2006.01) |
| B60W 40/076 | (2012.01) |
| B60K 6/20 | (2007.10) |

(52) U.S. Cl.
CPC .......... *B60W 30/143* (2013.01); *B60W 10/06* (2013.01); *B60W 10/08* (2013.01); *B60W 20/10* (2013.01); *B60W 30/18072* (2013.01); *B60K 6/20* (2013.01); *B60W 40/076* (2013.01); *B60W 2550/142* (2013.01); *B60W 2720/10* (2013.01); *Y02T 10/6286* (2013.01); *Y10S 903/93* (2013.01)

(58) Field of Classification Search
USPC .......................................... 701/22, 93; 477/3
See application file for complete search history.

(56) References Cited

U.S. PATENT DOCUMENTS

| | | | | |
|---|---|---|---|---|
| 5,921,883 A | * | 7/1999 | Bellinger | B60W 30/18 123/322 |
| 5,944,766 A | * | 8/1999 | White | B60K 31/047 180/179 |
| 6,374,173 B1 | * | 4/2002 | Ehlbeck | B60K 31/047 180/170 |
| 7,706,953 B1 | * | 4/2010 | Sun | B60K 31/042 123/399 |
| 8,532,906 B2 | | 9/2013 | Lu et al. | |
| 8,620,498 B2 | | 12/2013 | Zerbini et al. | |
| 2007/0265759 A1 | * | 11/2007 | Salinas | B60T 7/16 701/93 |
| 2007/0293994 A1 | * | 12/2007 | Zerbini | B60K 6/485 701/22 |

(Continued)

FOREIGN PATENT DOCUMENTS

| | | |
|---|---|---|
| JP | 2006226178 A | 8/2006 |
| JP | 2010280363 A | 12/2010 |

OTHER PUBLICATIONS

Per Sahlholm, "Distributed Road Grade Estimation for Heavy Duty Vehicles," Doctoral Thesis in Automatic Control, Stockholm, Sweden 2011 (193 pages).

*Primary Examiner* — Tyler Paige
(74) *Attorney, Agent, or Firm* — Carlson, Gaskey & Olds, P.C.

(57) ABSTRACT

An example method includes controlling a hybrid vehicle to maintain a set speed, and adjusting the set speed from a first value to a different, second value in response to a change in a road grade.

16 Claims, 2 Drawing Sheets

(56) References Cited

U.S. PATENT DOCUMENTS

| | | | | |
|---|---|---|---|---|
| 2008/0004779 | A1* | 1/2008 | Sah | B60K 6/26 701/51 |
| 2008/0314661 | A1* | 12/2008 | Soliman | B60K 6/442 180/65.245 |
| 2009/0137360 | A1* | 5/2009 | Shibata | B60K 6/365 477/3 |
| 2010/0248896 | A1* | 9/2010 | Dreier | F16H 61/0213 477/118 |
| 2010/0324752 | A1* | 12/2010 | Suganuma | B60W 40/06 701/1 |
| 2010/0332062 | A1* | 12/2010 | Goto | B60K 6/485 701/22 |
| 2011/0246019 | A1* | 10/2011 | Mineta | B60W 20/00 701/31.4 |
| 2011/0276216 | A1* | 11/2011 | Vaughan | B60W 10/06 701/31.4 |
| 2012/0022764 | A1* | 1/2012 | Tang | B60W 10/06 701/102 |
| 2012/0271524 | A1* | 10/2012 | Eriksson | B60W 10/08 701/93 |
| 2013/0006485 | A1* | 1/2013 | Kwasniewski | F16H 59/66 701/51 |
| 2013/0261889 | A1* | 10/2013 | Sekine | B60W 30/143 701/36 |
| 2014/0244083 | A1* | 8/2014 | Kim | B60W 20/00 701/22 |

* cited by examiner

ADJUSTING A HYBRID VEHICLE CRUISE CONTROL SPEED

BACKGROUND

Example electrified vehicles include hybrid electric vehicles (HEVs) and plug-in hybrid electric vehicles (PHEVs). Generally, hybrid vehicles differ from conventional vehicles because hybrid vehicles are selectively driven using a battery-powered electric machine. Conventional vehicles, by contrast, rely exclusively on an internal combustion engine to drive the vehicle.

Many hybrid vehicles and conventional vehicles permit an operator to select a cruise control mode of operation. When operating in the cruise control mode, the vehicle automatically accelerates and decelerates to maintain a vehicle speed close to a set speed. The operator of the vehicle typically provides the set speed as an input.

SUMMARY

A method according to an exemplary aspect of the present disclosure includes, among other things, controlling a hybrid vehicle to maintain a set speed, and adjusting the set speed from a first value to a different, second value in response to a change in a road grade.

In a further non-limiting embodiment of the foregoing method, the adjusting comprises automatically adjusting.

In a further non-limiting embodiment of any of the foregoing methods, the adjusting is in response a decreasing of the road grade.

In a further non-limiting embodiment of any of the foregoing methods, the second value is less than the first value.

In a further non-limiting embodiment of any of the foregoing methods, the method includes coasting the hybrid vehicle when the hybrid vehicle moves from a set speed corresponding to the first value to a set speed corresponding to the second value.

In a further non-limiting embodiment of any of the foregoing methods, the method includes varying the change in road grade required to cause the adjusting.

In a further non-limiting embodiment of any of the foregoing methods, the method includes varying an amount of the change in response to a time elapsed since a last start-up of the engine.

In a further non-limiting embodiment of any of the foregoing methods, the method includes decreasing the change in road grade required to illicit the response as the time elapsed increases.

In a further non-limiting embodiment of any of the foregoing methods, the method includes increasing the speed to a third value in response to the road grade increasing, the third value greater than the second value.

In a further non-limiting embodiment of any of the foregoing methods, the method includes increasing the second value back to the first value in response to the road grade increasing.

In a further non-limiting embodiment of any of the foregoing methods, the method includes shutting off an internal combustion engine of the hybrid vehicle in response after the adjusting and maintaining the hybrid vehicle at the speed corresponding to the second value using exclusively an electric machine.

In a further non-limiting embodiment of any of the foregoing methods, the controlling is during a cruise control operation of the hybrid vehicle.

An assembly according to another exemplary aspect of the present disclosure includes, among other things, a road grade detector to monitor a road grade, and a speed controller that maintains a set speed of a hybrid vehicle and adjusts the set speed from a first value to a different, second value in response to a change in the road grade.

In a further non-limiting embodiment of the foregoing assembly, the change is a decrease in the road grade.

In a further non-limiting embodiment of any of the foregoing assemblies, the second value is less than the first value.

In a further non-limiting embodiment of any of the foregoing assemblies, the speed controller adjusts the speed to a third value in response to another change in the road grade. The third value is greater than the second value.

In a further non-limiting embodiment of any of the foregoing assemblies, the controller varies the change in the road grade required to cause the speed controller to adjust the set speed.

In a further non-limiting embodiment of any of the foregoing assemblies, the controller varies the change in response to a time elapsed since a last start-up of an engine.

In a further non-limiting embodiment of any of the foregoing assemblies, the change in the road grade required to illicit the response decreases as the time elapsed increases.

In a further non-limiting embodiment of any of the foregoing assemblies, the set speed is a cruise control set speed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to adjusting speed of a hybrid vehicle. More particularly, this disclosure relates to automatically reducing a cruise control set speed in response to the hybrid vehicle moving downhill or uphill.

Figure 1:
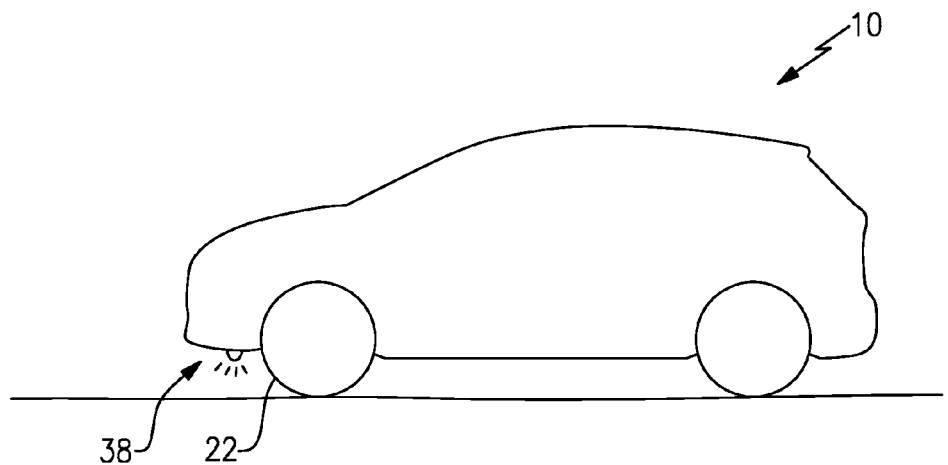
FIG. 1 shows an example hybrid vehicle.
Figure 2:
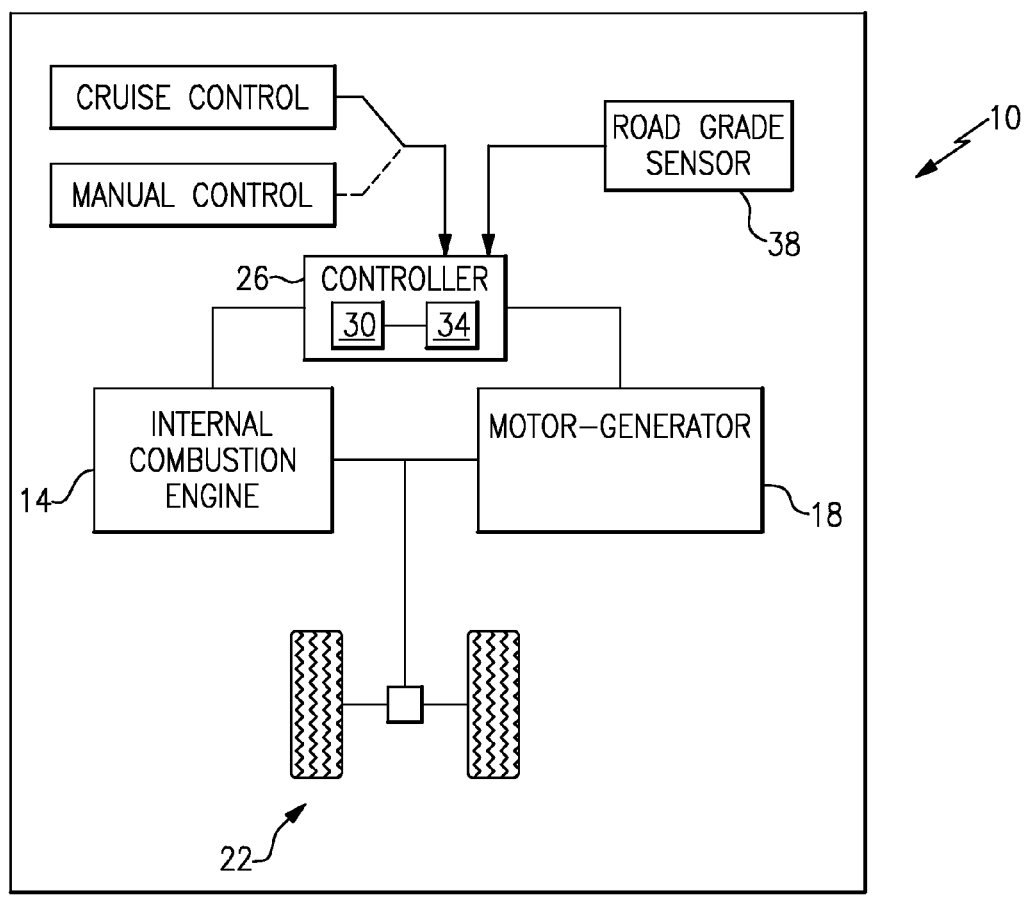
FIG. 2 shows a highly schematic view of selected portions of a hybrid vehicle powertrain control system used in connection with the hybrid vehicle of FIG. 1.

Referring to FIGS. 1 and 2, an example electric vehicle includes an internal combustion engine 14 and an electric machine 18, such as a motor-generator. The internal combustion engine 14, the electric machine 18, or both, may be used to provide power to a set of vehicle drive wheels 22. The electric machine 18 may be a combined motor-generator as shown or may include a motor separate from the generator.

The vehicle 10 includes a vehicle speed controller 26 operatively coupled to the internal combustion engine 14 and the electric machine 18. The controller 26 may be an engine control unit in some examples. The controller 26 could be one controller or a group of controllers.

The controller 26 controls whether the wheels 22 are driven by the internal combustion engine 14, the electric machine 18, or both. The controller 26 adjusts how the wheels 22 are driven in response to power requirements, for example.

The example controller 26 includes a processor 30 operatively linked to a memory portion 34. The processor 30 is programmed to execute a program stored in the memory portion 34. The program may be stored in the memory portion 34 as software code. The program stored in the memory portion 34 may include one or more additional or separate programs, each of which includes an ordered listing of executable instructions for implementing logical functions.

The processor 30 can be a custom made or commercially available processor, a central processing unit (CPU), an auxiliary processor among several processors associated with the controller 26, a semiconductor based microprocessor (in the form of a microchip or chip set) or generally any device for executing software instructions.

The controller 26 is operatively coupled to a road grade detector 38. As the vehicle 10 travels, the road grade beneath the vehicle 10 can change. The road grade detector 38 provides information about these changes to the controller 26.

In one example, the road grade detector 38 is a controller that calculates the difference between the current wheel power compared to an estimated wheel power for a particular grade. The difference provides information sufficient to estimate of the road grade. In another example, the road grade detector 38 is a road grade sensor, such as a device incorporating an accelerometer. A person having skill in this art and the benefit of this disclosure would be able to develop a road grade detector suitable for determining road grade associated with the vehicle 10.

As is known, road grade can be expressed as a percentage of tilt from level ground or horizontal grade. An uphill road has a positive road grade. A downhill road has a negative road grade.

Although road grade is used, road grade is not limited exclusively to grades of typical asphalt roads and can refer to the grade of any surface that the vehicle 10 is traversing. That is, if the vehicle 10 is off-roading, the road grade detector would still report the relevant grade information to the controller 26.

The road grade detector 38 may detect road grade changes directly beneath the vehicle 10, road grade changes forward from the vehicle 10, or in some other area. As can be appreciated, the road grade can change as the vehicle 10 is driven.

When driven, the example vehicle 10 selectively operates in a cruise control mode. An operator of the vehicle may place the vehicle 10 in cruise control mode by actuating a switch, for example.

In cruise control mode, the controller 26 continually increases and decreases power to keep the vehicle 10 traveling at a set speed. The operator of the vehicle may adjust a value to change the set speed. Changes in road grade influence the power required to keep the vehicle 10 traveling at the set speed.

In one specific example, after the vehicle 10 accelerates and reaches a speed of 55 Mph, the operator starts the cruise control mode of operation and establishes the value at 55 Mph. The controller 26 then automatically adjusts the powertrain of the vehicle 10 to keep the vehicle 10 traveling at 55 Mph.

When the vehicle 10 moves uphill, the controller 26 calls for more power from the engine 14, the electric machine 18, or both. More power is necessary to keep the vehicle 10 traveling at 55 Mph when the vehicle is moving uphill.

When the vehicle 10 moves downhill, the controller 26 lowers the power from the engine 14, the electric machine 18, or both. Less power is necessary to keep the vehicle 10 moving at 55 Mph when the vehicle 10 is moving downhill.

Although described as maintained at 55 Mph, those skilled in the art and having the benefit of this disclosure will understand that the actual speed of the vehicle 10 will be nominally 55 Mph. That is, variations within the system may cause the speed of the vehicle 10 to fluctuate up and down slightly from 55 Mph. The value, however, remains at 55 Mph.

The value could also be a range, such as from 55 to 57 Mph, rather than a single speed.

Figure 3:
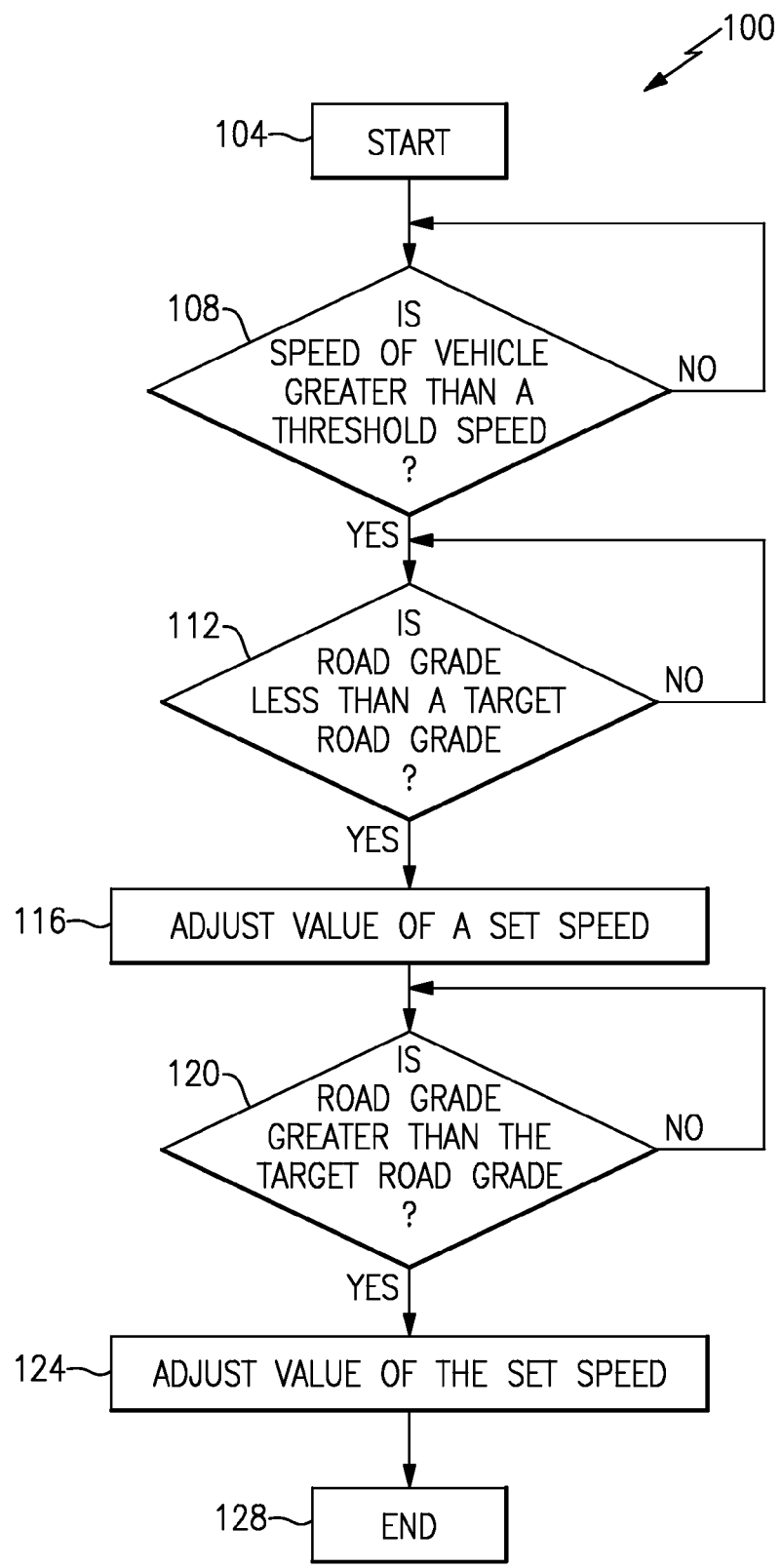
FIG. 3 shows an example flow of a method of controlling the hybrid vehicle of FIG. 1.

Referring now to FIG. 3 with continuing reference to FIG. 1, an example method 100 of operating a vehicle 10 in cruise control automatically adjusts the cruise control value in response to a change in road grade. Specifically, the method 100 reduces the value of the value when the vehicle 10 is traveling along a downhill grade. The value may be reduced by more than 2 Mph in some examples.

The example of FIG. 3 is described as adjusting in response to a downhill grade. In another example, the method 100 may adjust the cruise control value in response to the vehicle 10 traveling along an uphill grade, which is an increasing of the road grade. The benefit of altering the cruise control speed can result in a fuel economy increase on an uphill grade, for example. The set speed may be adjusted downward or upward in response to the change in grade.

Referring to the method 100, after a start step 104, the method 100 moves to a step 108, which determines whether a vehicle speed is greater than a threshold speed. In this example, the threshold speed and initial value are 50 Mph.

In this example, reaching the threshold speed is required before the method 100 continues. This ensures that the vehicle 10 is traveling at the threshold speed before the remaining steps in the method 100 can take place.

If the vehicle speed is greater than the threshold speed, the method 100 next, at a step 112, calculates whether the road grade traveled over by the vehicle 10 is less than a target road grade, such as negative two degrees. If yes, the method 100 moves to the step 116.

At the step 116, the controller 26 automatically changes the value speed from the 50 Mph value to a new value, such as 47 Mph. The vehicle 10 then coasts or glides from 50 Mph to 47 Mph in a glide mode of operation. The glide mode generally refers to the transition from the original set speed to the temporary lower set speed. The example change is not a stepped change to the control speed. A stepped changed could be noticeable to the driver. Instead, the glide mode causes the vehicle to gradually "glide" to the temporary set speed so that it is as close to imperceptible to the driver as possible. Filters and rate limits on the commanded control speed may be used to achieve the glide.

Reducing the speed of the vehicle 10 at the step 112 decreases demand from the powertrain of the vehicle 10. The engine 14 may shut off in response to the reduced demand.

The method 100 then moves to a step 120 where the road grade is monitored and, if greater than the target road grade, the value is increased back to the original value or some other value at a step 124. The target road grade may be a within a certain percentage from 0 percent grade, which can indicate that vehicle 10 is back to nearly level ground.

The method ends at a step 128.

The value adjustment at the step 112 can reduce the power requirements, which may permit the engine 14 to shut-down. If the engine 14 is shut down, the controller 26 has calculated that the electric machine 18 alone is able to provide power sufficient to drive and maintain the vehicle 10 at the adjusted value of step 112.

In some specific examples of the step 112, the target road grade causing the value adjustment may be varied based on how recently the engine 14 was operated. This facilitates avoiding the engine 14 alternating between shut-down and start-up too quickly.

If the engine 14 is operating and has operated for a relatively long time, a relatively slight downhill grade may trigger the value adjustment at the step 116. On the other hand, if the engine 14 is operating and has operated for a relatively short time, a larger downhill grade may be required to trigger the value adjustment.

The below table shows an example timing chart and associated target road grade.

| Time (s) | 60 | 180 | 480 |
| --- | --- | --- | --- |
| Grade (%) | −5 | −3 | −1 |

The timing represents the time in seconds since the last pull down of the engine 14. As shown, as the time increases, the road grade causing the vehicle 10 to adjust the value at the step 112 is reduced.

Varying the amount of road grade triggering the value adjustment increases the likelihood for shutting down the engine 14 as the operating time for the engine 14 increases.

With specific regard to changes in response to uphill grade, the changing of the set speed may not reduce the powertrain power demand enough to allow the engine to shut off. The change, however, will slightly lower powertrain demand, which will be more efficient in terms of fuel economy and will also allow require less power from the engine. Further, with the reduction in power, the engine can run at a lower speed and the NVH (engine loudness) will improve. The set speed may change back to the original set speed when the grade returns from uphill to a nearly level grade.

Features of the disclosed examples include improving the fuel economy of a hybrid vehicle by changing the set speed used by the cruise control system. Another feature is increased customer satisfaction due to reduced use of the engine and real or perceived efficiency gains.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A method of adjusting a speed, comprising:
   controlling a hybrid vehicle to maintain a set speed;
   adjusting the set speed from a first value to a different, second value in response to a detected amount of change in a road grade; and
   in response to a time elapsed since a last start-up of the engine, varying the detected amount required to cause the adjusting.

2. The method of claim 1, wherein the adjusting comprises automatically adjusting.

3. The method of claim 1, wherein the adjusting is in response to a decreasing of the road grade.

4. The method of claim 1, wherein the second value is less than the first value.

5. The method of claim 4, further comprising coasting the hybrid vehicle when the hybrid vehicle moves from the set speed corresponding to the first value to the set speed corresponding to the second value.

6. The method of claim 4, further comprising increasing the speed to a third value in response to the road grade increasing, the third value greater than the second value.

7. The method of claim 1, further comprising decreasing the detected amount required to cause the adjusting as the time elapsed increases.

8. The method of claim 1, further comprising increasing the second value back to the first value in response to the road grade increasing.

9. The method of claim 1, shutting off an internal combustion engine of the hybrid vehicle in response after the adjusting and maintaining the hybrid vehicle at the speed corresponding to the second value using exclusively an electric machine.

10. The method of claim 1, wherein the controlling is during a cruise control operation of the hybrid vehicle.

11. The assembly of claim 1, wherein the change in the road grade required to illicit the response decreases as the time elapsed increases.

12. A hybrid vehicle assembly, comprising:
    a road grade detector to monitor a road grade; and
    a speed controller that maintains a set speed of a hybrid vehicle and adjusts the set speed from a first value to a different, second value in response to a detected amount of change in the road grade,
    wherein the speed controller, in response to a time elapsed since a last start-up of an engine, varies the detected amount required to cause the speed controller to adjust the set speed.

13. The assembly of claim 12, wherein the change is a decrease in the road grade.

14. The assembly of claim 13, wherein the speed controller adjusts the speed to a third value in response to another change in the road grade, the third value greater than the second value.

15. The assembly of claim 12, wherein the second value is lower than the first value.

16. The assembly of claim 12, wherein the set speed is a cruise control set speed.

* * * * *

UNITED STATES PATENT AND TRADEMARK OFFICE
CERTIFICATE OF CORRECTION

PATENT NO. : 9,630,622 B2  
APPLICATION NO. : 14/329408  
DATED : April 25, 2017  
INVENTOR(S) : Chris Michael Kava Page 1 of 1

It is certified that error appears in the above-identified patent and that said Letters Patent is hereby corrected as shown below:

In the Claims

In Claim 1, Column 6, Line 7; after "start-up of" replace "the" with --an--

In Claim 11, Column 6, Line 36; replace "The assembly" with --The method--

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*